(12) United States Patent
Peral

(10) Patent No.: US 9,445,655 B2
(45) Date of Patent: Sep. 20, 2016

(54) PORTABLE ELECTRONIC DEVICE COVER WITH FLUID CONTAINER COMPARTMENT

(71) Applicant: Enrique Peral, San Juan, PR (US)

(72) Inventor: Enrique Peral, San Juan, PR (US)

(*) Notice: Subject to any disclaimer, the term of this patent is extended or adjusted under 35 U.S.C. 154(b) by 225 days.

(21) Appl. No.: 14/223,175

(22) Filed: Mar. 24, 2014

(65) Prior Publication Data

US 2015/0271940 A1    Sep. 24, 2015

(51) Int. Cl.
| | |
|---|---|
| *H04M 1/18* | (2006.01) |
| *A45C 15/00* | (2006.01) |
| *A45C 11/38* | (2006.01) |
| *A45F 3/18* | (2006.01) |
| *H04B 1/3888* | (2015.01) |
| *A45C 11/00* | (2006.01) |

(52) U.S. Cl.
CPC .............. *A45C 15/00* (2013.01); *A45C 11/38* (2013.01); *A45F 3/18* (2013.01); *A45C 2011/002* (2013.01); *A45C 2011/003* (2013.01); *A45C 2011/007* (2013.01); *H04B 1/3888* (2013.01)

(58) Field of Classification Search
CPC ..... H04M 1/185; H04M 1/18; H04M 1/0202
USPC ........ 220/703, 711, 713, 721, 720; 206/320, 206/216, 217, 829
See application file for complete search history.

(56) References Cited

U.S. PATENT DOCUMENTS 4,969,587 A * 11/1990 Miller .................... A45D 34/00
132/315

* cited by examiner

*Primary Examiner* — Steve A. Reynolds
*Assistant Examiner* — King M Chu
(74) *Attorney, Agent, or Firm* — Eugenio J. Torres-Oyola; Victor Rodriguez-Reyes; Ferraiuoli LLC

(57) ABSTRACT

A portable device cover integrated with a fluid container compartment comprising a chamber for storing a fluid for either medicinal or hydration purposes while reducing the need of additional fluid containers.

10 Claims, 3 Drawing Sheets

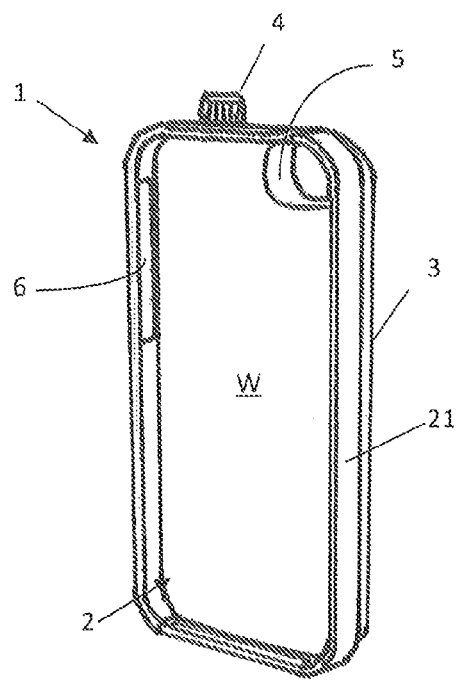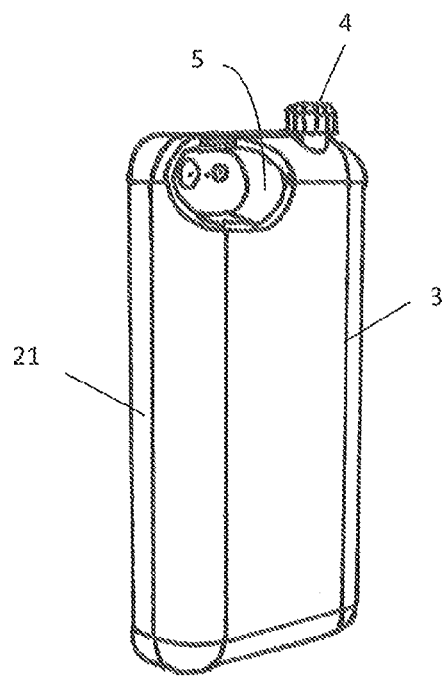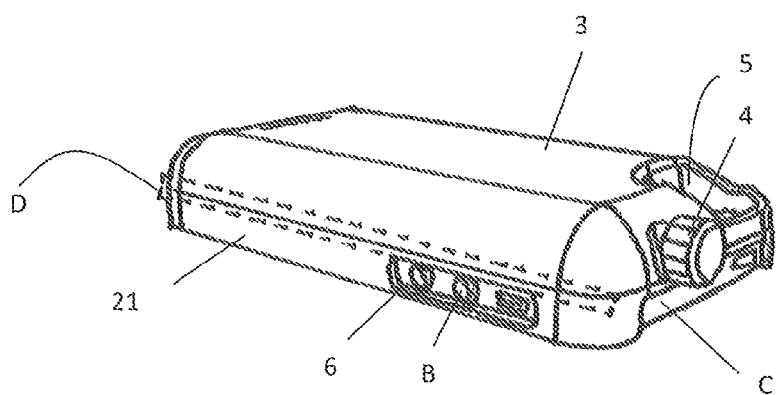

PORTABLE ELECTRONIC DEVICE COVER WITH FLUID CONTAINER COMPARTMENT

STATEMENT REGARDING FEDERALLY SPONSORED RESEARCH AND DEVELOPMENT

N/A

RELATED APPLICATIONS

N/A

BACKGROUND OF THE DISCLOSURE

1. Field of the Disclosure

The present disclosure relates to generally to a portable electronic device having a fluid container compartment incorporated therein. More particularly, the present invention relates to a cover for an electronic portable electronic device comprising a container for storing fluids integrated to a mobile electronic device cover.

2. Discussion of the Background

Portable electronic devices, for example, a mobile telephone, a mobile personal computer (PC), a personal digital assistant (PDA), a digital camera or a portable music player have become a necessity more than a luxury. A high number of people already carry around at least one portable electronic device. For the portable electronic devices users the additional burden of transporting a liquid container for either liquid medicine or hydration purposes becomes unduly difficult. The administration of such fluids is often required or desired at any time, and therefore requires a user to carry a flask or any fluid container device used to dispense such fluids whenever may be necessary.

Therefore there is a need to provide a portable device cover integrated with a fluid container compartment for either medicinal or hydration purposes while reducing the need of additional fluid container.

SUMMARY

The present invention relates to a cover for a portable electronic device comprising a chamber for storing fluids allowing people to take fluids on the go.

It is another object of the present invention to provide a portable electronic device cover having fluid dispensing capability.

In one aspect, the present invention provides a portable electronic device cover comprising an housing having at least one hollow section for receiving an portable electronic device; and a fluid container compartment, wherein said fluid container compartment is integrally made with the hollow section for receiving an portable electronic device, and wherein said fluid container compartment comprises an chamber defined within said inner housing and within which a fluid is contained.

There is further provided, in accordance with the principles of the present invention, a kit comprising: an cover for a mobile electronic device, wherein said cover comprises a housing with a hollow section for receiving a mobile electronic device; a fluid container compartment comprising a chamber and an input for accessing the chamber and an liquid deliver mechanism wherein said liquid deliver mechanism comprises at least a small protrusion with a hole, wherein said protrusion comprising a radio smaller than the input configured to mechanically be inserted inside input perimeter and wherein said liquid deliver mechanism is used to channel the flow a fluid inside the chamber through the input.

In general, the present disclosure overcomes the disadvantages and shortcomings of prior art by disclosing a portable device cover with a fluid container compartment.

The disclosure itself, both as to its configuration and its mode of operation will be best understood, and additional objects and advantages thereof will become apparent, by the following detailed description of a preferred embodiment taken in conjunction with the accompanying drawings.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying drawings, which are incorporated herein, constitute part of the specification and illustrate the preferred embodiment of the disclosure.

FIG. 1 shows a portable electronic device cover front perspective view of the general structure in accordance with the principles of the present disclosure.

FIG. 2 shows the portable electronic device cover back perspective view of the general structure in accordance with the principles of the present disclosure.

FIG. 3 shows the portable electronic device cover assembled to the portable electronic device in accordance with the principles of the present disclosure.

DESCRIPTION OF THE PREFERRED EMBODIMENT

Figure 4:
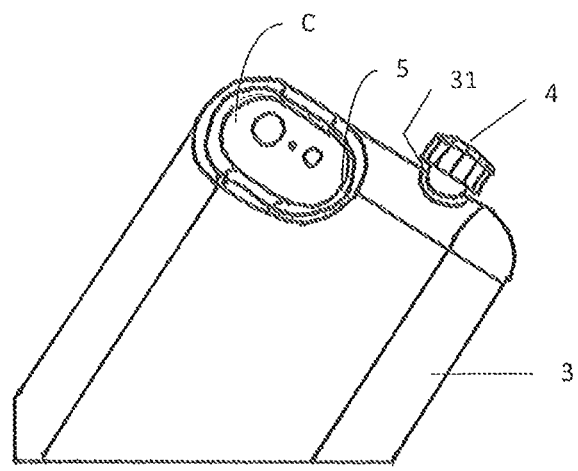
FIG. 4 shows the top back part of the portable electronic device cover in accordance with the principles of the present disclosure.

FIG. 1 and FIG. 2 show the general structure, more particularly a front view and back view, in accordance with the principles of the present disclosure. The cover 1 comprises a hollow section 2 mechanically couple or integrally made with a fluid container compartment 3.

The hollow section 2 comprise a hosing base or back wall W having a planar surface, external walls or side walls 21 extending vertical from said planar surface and located at the back wall's perimeters, wherein said back wall W and side wall 21 are configured to limit the motion of the portable electronic device C once is positioned inside the hollow section 2. Further the side walls 21 are shaped to fit the portable electronic device C inside the hollow section 2. The side walls 21 also comprise several grooves 6, 5. Each groove 6, 5 are designated and located on particular section on the side walls 21 in order to provide access to certain features of the portable electronic device C such as volume buttons, camera lens, microphone, headphones socket and charger/USB ports. FIG. 1 shows a first groove 6 for volume control access once the portable electronic device C is in place inside the hollow section 2.

Further FIG. 2 shows the back part of the cover 1 in more detail, wherein a second groove 5 configured to extend until reaching the fluid container compartment 3. The fluid container compartment 3 comprises a chamber with an opening 4. The opening 4 is intended to be at the top part of the cover 1.

FIG. 3 is directed to the cover 1 covering portable electronic device C. Further, as mentioned above, the first groove 6 provides access to several portable electronic device features, including volume. The present structure is intended to provide a separation between the electronic device C and the fluid compartment 3 by means of the back wall W. For a better understanding of the separation between the hollow section 2 and the fluid compartment 3 a line D is pointed out on FIG. 3. It is important to understand that the hollow section 2 and the fluid compartment 3 could be integrally made or mechanically coupled by attaching means such as adhesive, magnets and any structure capable of coupling the hollow section 2 and fluid compartment 3 together.

Figure 5:
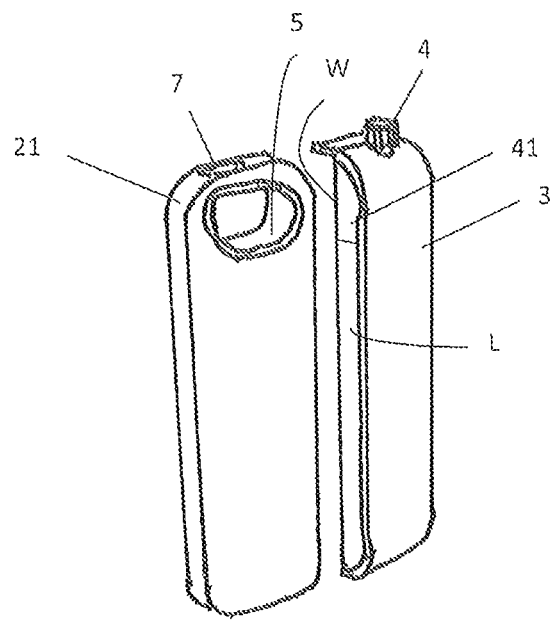
FIG. 5 shows a cut out view of the portable electronic device cover in accordance with the principles of the present disclosure.

FIG. 4 provides an exploded view of the top part of the cover 1. The groove 5, as previously mentioned, provides access some features. Further the opening 4 comprises an outlet 31 configured to be extended from the fluid compartment 3. As shown in FIG. 5, the opening is preferred to be positioned at the top of the cover 1, wherein said opening 4 provides access to the chamber 41 wherein the fluid L is stored. Other grooves, such as a third grove 7 could be added to the cover 1, more particularly to the side walls 21 in order to provide access to other portable electronic device C features. The amount of fluid inside the chamber 41 will depend on the chamber's dimensions.

Figure 6:
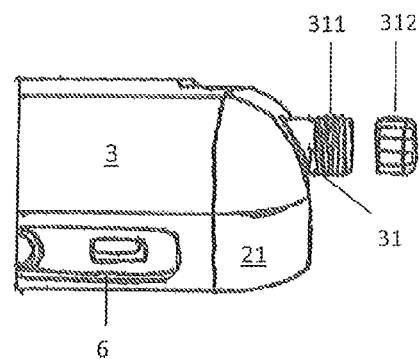
FIG. 6 shows an exploded of view of the first exemplary embodiment of the fluid container compartment input in accordance with the principles of the present disclosure.

The opening 4, as shown in FIG. 6, comprises a cap 312 coupled to the outlet 31 by means of threaded surface 311. Other means to cover the outlet 31 could be used, such as a Snap-On cap.

Figure 7:
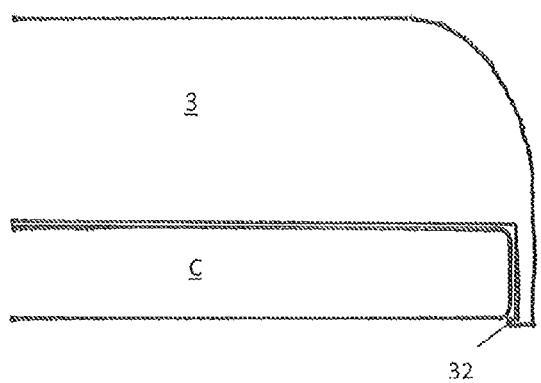
FIG. 7 shows a cut out view of the first exemplary embodiment of the hollow section assembled to the portable electronic device in accordance with the principles of the present disclosure.

FIG. 7 is directed to the kit and the process to pour fluid inside the chamber 41. As shown, a funnel D1 is used. The funnel D1 comprises at least a distal end with a diameter smaller than the outlet 31 diameter; in such way that can be inserted inside the outlet is order to transfer fluid inside the chamber C without spills.

Figure 8:
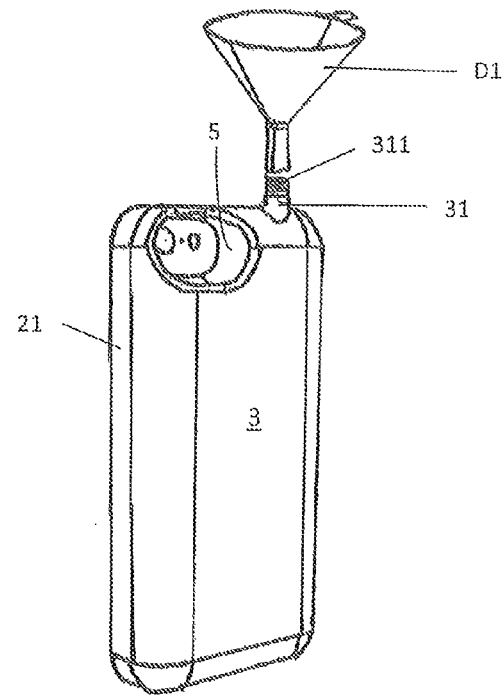
FIG. 8 shows a first exemplary embodiment of a kit including the portable electronic device in accordance with the principles of the present disclosure.

The hollow section 2, more particularly the side walls are configured to provide at least a protrusion 32 extended approximately perpendicular from the side wall 21, wherein said protrusion 32 avoid the unwanted movement of the portable electronic device C once it is positioned inside the hollow section 2. As shown in FIG. 8, the protrusion 32 holds the portable electronic device C inside the hollow section 2.

The disclosure is not limited to the precise configuration described above. While the disclosure has been described as having a preferred design, it is understood that many changes, modifications, variations and other uses and applications of the subject disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

The invention claimed is:

1. A portable electronic device cover comprising:
a cover including an housing and a fluid container compartment; wherein said housing comprises a hollow section including an first opening for receiving portable electronic device, wherein said first opening provides permanent access to said hollow section, wherein said hollow section comprises a back wall having a planar surface, and side walls extending vertical from said planar surface, wherein said side walls are located at the back wall's perimeters, wherein said back wall and side wall are configured to limit the motion of the portable electronic device, wherein said side walls are shaped to fit said portable electronic device inside said hollow section;
and wherein said fluid container compartment is mechanically coupled with the hollow section wherein said fluid container compartment comprises a chamber that extends away from said side walls, and wherein said fluid container compartment comprises an opening, wherein said back wall separates the fluid container compartment from the hollow section.

2. The portable electronic device cover as in claim 1, wherein said portable electronic device comprises at least one feature selected from a camera lens, volume control, microphone, headphones socket and charger/USB ports; and wherein said side walls comprise at least a first groove, wherein said first groove is aligned with said feature in order to provide access inside said hollow section.

3. The portable electronic device cover as in claim 2, comprises a second groove located at the back wall wherein said second groove extends from the back wall through the fluid container.

4. The portable electronic device cover as in claim 2, comprises a third groove, wherein said third groove provides access inside said hollow section.

5. The portable electronic device cover as in claim 1, wherein said side walls comprises a protrusion, wherein said protrusion extends approximately perpendicular from the side walls.

6. The portable electronic device cover as in claim 1, wherein said opening comprises an outlet configured to be extended from the fluid compartment.

7. A kit for a portable electronic device cover with fluid container compartment comprising:
- a cover for a portable electronic device, wherein said cover comprises a housing, wherein said housing comprises a hollow section including an opening for receiving said portable electronic device, wherein said opening provides permanent access to said hollow section, wherein said hollow section comprises a back wall having a planar surface, and side walls extending vertical from said planar surface, wherein said side walls are located at the back wall's perimeters, wherein said back wall and side wall are configured to limit the motion of the portable electronic device, wherein said side walls are shaped to fit said portable electronic device inside said hollow section;
- a fluid container compartment comprising a chamber and an input including a first diameter for accessing the chamber;
- and an liquid deliver mechanism, wherein said liquid deliver mechanism comprises at least a small protrusion with a hole, wherein said hole comprises a second diameter, wherein said second diameter is smaller than the first diameter, and wherein said hole is configured to be inserted inside said input.

8. The kit for a portable electronic device cover with fluid container compartment as in claim 7, wherein said fluid container compartment is mechanically coupled with the hollow section wherein said fluid container compartment comprises a chamber that extends away from said side walls.

9. The kit for a portable electronic device cover with fluid container compartment as in claim 7, wherein said portable electronic device comprises at least one feature; and wherein said side walls comprise at least a groove, wherein each groove are aligned with said feature in order to provide access inside said hollow section.

10. The kit for a portable electronic device cover with fluid container compartment as in claim 7, wherein said side walls comprises a protrusion, wherein said protrusion extends approximately perpendicular from the side walls.

\* \* \* \* \*